United States Patent
Shen et al.

(10) Patent No.: US 10,002,308 B2
(45) Date of Patent: Jun. 19, 2018

(54) POSITIONING METHOD AND APPARATUS USING POSITIONING MODELS

(71) Applicant: Samsung Electronics Co., Ltd., Suwon-si (KR)

(72) Inventors: Xiaolu Shen, Beijing (CN); Biao Wang, Beijing (CN); Xuetao Feng, Beijing (CN); Jae Joon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 15/172,751

(22) Filed: Jun. 3, 2016

(65) Prior Publication Data

US 2016/0283820 A1    Sep. 29, 2016

Related U.S. Application Data

(63) Continuation of application No. PCT/KR2014/011793, filed on Dec. 4, 2014.

(30) Foreign Application Priority Data

Dec. 13, 2013    (CN) .......................... 2013 1 0684862

(51) Int. Cl.
G06K 9/00    (2006.01)
G06K 9/46    (2006.01)
G06K 9/62    (2006.01)

(52) U.S. Cl.
CPC ....... *G06K 9/4671* (2013.01); *G06K 9/00281* (2013.01); *G06K 9/6211* (2013.01); *G06K 9/6255* (2013.01)

(58) Field of Classification Search
CPC ............... G06K 9/4671; G06K 9/6211; G06K 9/00281; G06K 9/6255; G06K 9/00228;
(Continued)

(56) References Cited

U.S. PATENT DOCUMENTS 6,545,663 B1 *    4/2003    Arbter .................. G06F 3/0425
                                                              345/156
7,174,035 B2     2/2007    Liu et al.
(Continued)

FOREIGN PATENT DOCUMENTS

KR    10-2008-0068988 A     7/2008
KR       10-1089847 B1    12/2011
(Continued)

OTHER PUBLICATIONS

International Search Report dated Mar. 4, 2015 in counterpart International Patent Application No. PCT/KR2014/011793 (3 pages in Korean).

*Primary Examiner* — Amir Alavi
(74) *Attorney, Agent, or Firm* — NSIP Law

(57) ABSTRACT

Provided are a positioning method and apparatus. The positioning method includes acquiring a plurality of positioning results including positions of key points of a facial area included in an input image, respectively using a plurality of predetermined positioning models, evaluating the plurality of positioning results using an evaluation model of the positions of the key points, and updating at least one of the plurality of predetermined positioning models and the evaluation model based on a positioning result that is selected, based on a result of the evaluating, from among the plurality of positioning results.

19 Claims, 14 Drawing Sheets

(58) Field of Classification Search
CPC ........... G06K 9/00222; G06K 9/00287; G06K 9/00248
See application file for complete search history.

(56) References Cited

U.S. PATENT DOCUMENTS

| | | | |
|---|---|---|---|
| 7,218,760 B2 | 5/2007 | Gu et al. | |
| 8,068,662 B2 | 11/2011 | Zhang et al. | |
| 8,155,399 B2 | 4/2012 | Liu et al. | |
| 8,165,354 B1 | 4/2012 | Zhao | |
| 8,254,645 B2 | 8/2012 | Okubo | |
| 8,280,173 B2 | 10/2012 | Kato et al. | |
| 8,478,077 B2 | 7/2013 | Liu et al. | |
| 2005/0036688 A1* | 2/2005 | Froeba | G06K 9/00228 382/199 |
| 2007/0269107 A1 | 11/2007 | Iwai et al. | |
| 2008/0219516 A1 | 9/2008 | Suzuki et al. | |
| 2008/0298643 A1 | 12/2008 | Lawther et al. | |
| 2009/0185723 A1 | 7/2009 | Kurtz et al. | |
| 2009/0196467 A1 | 8/2009 | Okubo | |
| 2011/0091070 A1* | 4/2011 | Havaldar | G06T 13/20 382/103 |
| 2012/0002867 A1 | 1/2012 | Ishiyama et al. | |
| 2012/0288166 A1 | 11/2012 | Sun et al. | |
| 2015/0098634 A1* | 4/2015 | Ohsuga | G06K 9/00845 382/118 |
| 2015/0110349 A1* | 4/2015 | Feng | G06K 9/00234 382/103 |
| 2016/0183812 A1* | 6/2016 | Zhang | A61B 5/7246 600/301 |
| 2016/0283820 A1* | 9/2016 | Shen | G06K 9/00281 |
| 2016/0300100 A1* | 10/2016 | Shen | G06K 9/00248 |
| 2017/0032214 A1* | 2/2017 | Krenzer | G06K 9/00335 |
| 2017/0148224 A1* | 5/2017 | Alvarez | G06T 17/20 |

FOREIGN PATENT DOCUMENTS

| | | |
|---|---|---|
| KR | 10-1096049 B1 | 12/2011 |
| KR | 10-1130817 B1 | 4/2012 |

\* cited by examiner

1400

1500

1600

POSITIONING METHOD AND APPARATUS USING POSITIONING MODELS

CROSS-REFERENCE TO RELATED APPLICATION(S)

This application is a continuation of International Application No. PCT/KR2014/011793 filed on Dec. 4, 2014, which claims the benefit of Chinese Patent Application No. 201310684862.6 filed on Dec. 13, 2013, in the State Intellectual Property Office of the Peoples Republic of China, the entire disclosures of which are incorporated herein by reference for all purposes.

BACKGROUND

1. Field

The following description relates to technology for identifying a face, and more particularly, to a positioning method and apparatus of key points of a face using a plurality of positioning models.

2. Description of Related Art

When recognizing a face, positioning technology is used to acquire geometric positions of key points, for example, an eye contour, a lip line, and a tip of the nose, for example, based on an initial position of the face detected in an input image. Such positioning technology may have a direct influence on the application fields, such as face identification, image enhancement, and facial animation. A facial image may vary due to a variety of elements, for example, posture, facial expression, lighting, gender, skin tone, complexion, age, and race of the underlying person. Such variations may affect the stability or validity of determined positions for key points for facial recognition.

SUMMARY

One or more embodiments provide a positioning method including acquiring a plurality of positioning results including positions of key points of a facial area included in an input image, respectively using a plurality of predetermined positioning models, evaluating the plurality of positioning results using an evaluation model of the positions of the key points, and updating at least one of the plurality of predetermined positioning models and the evaluation model based on a positioning result that is selected, based on a result of the evaluating, from among the plurality of positioning results.

The acquiring of the plurality of positioning results may include respectively mapping the input image to each of the plurality of predetermined positioning models, and acquiring respective positions of the key points of the facial area corresponding to key points of each of the plurality of predetermined positioning models.

The plurality of predetermined positioning models may correspond to respectively different types of training sets including facial image samples.

The plurality of predetermined positioning models may be previously acquired through training, where the training included acquiring an average position value of key points of facial image samples included in each of respectively different types of training sets, acquiring scale invariant feature transform (SIFT) features about the average position value of the key points of the facial image samples by mapping the average position value of key points to a corresponding facial area, acquiring a feature vector by combining the SIFT features, and training a positioning model based on the feature vector.

The method may further include training positioning models using each of different types of training sets including facial image samples to respectively determine the plurality of predetermined positioning models.

The training of the positioning models may include acquiring an average position value of key points of the facial image samples included in each of the different types of training sets, acquiring scale invariant feature transform (SIFT) features about the average position value of key points of the facial image samples by mapping the average position value of key points to the facial area, acquiring a feature vector by combining the SIFT features, and training at least one of the positioning models based on the feature vector.

The acquiring of the plurality of positioning results may include acquiring a position of a key point of the facial area based on the feature vector.

The updating of at least one of the plurality of predetermined positioning models and the evaluation model may include classifying an image type of the facial area based on the selected positioning result, and updating at least one of the plurality of predetermined positioning models and the evaluation model based on the classified image type.

The evaluation model may include a plurality of classifiers respectively trained in correspondence to the key points.

The evaluating of the plurality of positioning results may include configuring image blocks with a preset size based on determined positions of the key points respectively included in the plurality of positioning results, acquiring evaluation ratings by inputting the image blocks to the classifiers, and evaluating the plurality of positioning results based on the evaluation ratings.

The image blocks may include a positive sample image block in which a distance between a center position, of the positive sample image block, and a position of a key point is within a preset distance and a negative sample image block in which a distance between a center position, of the negative sample image block, and the position of the key point is outside the preset distance.

The updating of at least one of the plurality of predetermined positioning models and the evaluation model may include selecting a single positioning result from among the plurality of positioning results based on the evaluation ratings, comparing evaluation ratings of the selected single positioning result to a preset first threshold, and updating at least one of the evaluation model and the plurality of predetermined positioning models based on a result of the comparing.

When the updating of at least one of the plurality of predetermined positioning models and the evaluation model includes updating the evaluation model, the updating of the evaluation model may include adding an input image corresponding to the selected single positioning result to a training set, generating a preset number of positive sample image blocks and negative sample image blocks based on positions of key points corresponding to the selected single positioning result, and updating the evaluation model by training the classifiers using the generated positive sample image blocks and negative sample image blocks.

When the updating of at least one of the plurality of predetermined positioning models and the evaluation model includes updating a positioning model of the plurality of the predetermined positioning models, the updating of the positioning model may include determining a type of a positioning model corresponding to the selected single positioning result, in response to the evaluation ratings of the selected single positioning result being determined to be greater than the first threshold.

The updating of the positioning model may further include adding the selected single positioning result to a training set corresponding to one of plural respective types of the plurality of predetermined positioning models, in response to the determined type being determined to correspond to any of the plural respective types of the plurality of predetermined positioning models, and updating the positioning model by training the plurality of predetermined positioning models using the training set to which the selected single positioning result was added.

The updating of the positioning model may include configuring a new training set corresponding to the selected single positioning result, in response to the determined type being determined to not correspond to the plural respective types of the plurality of predetermined positioning models.

The method may further include training a new positioning model based on facial image samples included in the new training set, in response to a total number of facial image samples included in the new training set being determined to be greater than a second threshold.

One or more embodiments provide a non-transitory computer-readable recording medium including computer readable code to control at least one processing device to implement any or any combination of the methods described herein.

One or more embodiments provide a positioning apparatus including a communicator configured to acquire an input image, a memory configured to store a plurality of predetermined positioning models, and a processor configured to acquire a plurality of positioning results including positions of key points of a facial area included in the input image, respectively using the plurality of predetermined positioning models, and to update at least one of the plurality of predetermined positioning models and an evaluation model based on a positioning result that is selected, based on an evaluation result acquired using an evaluation model of the positions of the key points, from among the plurality of positioning results.

The processor may be further configured to configure image blocks with a preset size based on determined positions of the key points respectively included in the plurality of positioning results, to acquire evaluation ratings by inputting the image blocks to a plurality of classifiers respectively trained in correspondence to the key points, and to acquire the evaluation result based on the evaluation ratings.

The processor may be further configured to select a single positioning result from among the plurality of positioning results based on the evaluation ratings, and to update at least one of the evaluation model and the plurality of predetermined positioning models based on a result of a comparing of the evaluation ratings of the selected single positioning result to a preset first threshold.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
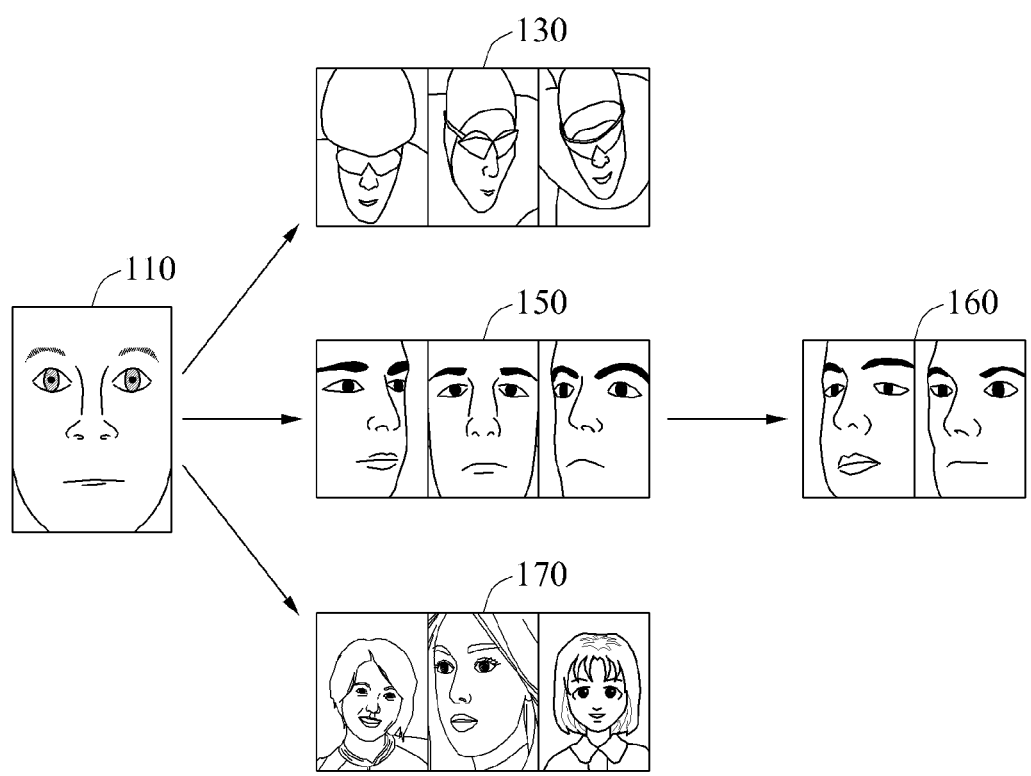
FIG. 1 illustrates an example of a positioning method with a classifying of a training set.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs after an understanding of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Further, when describing the examples with reference to the accompanying drawings, like reference numerals are assigned to like constituent elements throughout and iterative descriptions related thereto are omitted here. When it is determined detailed description related to a known function or configuration they may render the purpose of the present disclosure unnecessarily ambiguous in describing the examples, the detailed description will be omitted here.

FIG. 1 illustrates an example of a positioning method with a classifying of a training set.

Referring to FIG. 1, an input image 110 and different types of training sets 130, 150, and 170 for classifying the input image 110 are illustrated.

As described above, facial images vary based on a variety of factors. Due to such variations, determining a position for facial recognition is not easy. In one example, the term 'positioning' may be understood as meaning to set, for example, localize positions of key points or landmarks used to recognize or identify a face, e.g. to determine positions of key points or landmarks of a determined face image or face including portion of an image.

In one or more examples, a person or user corresponding to the input image 110 may be identified by classifying the input image 110 using a variety of models respectively based on a change probability by a variety of factors, for example, facial image samples included in of from different types of training sets. The input image 110 is classified using, for example, a first training set 130 including facial image samples wearing facial accessories such as glasses or ski goggles, a second training set 150 including facial image samples with select ethnic or racial traits or features, and a third training set 170 including facial image samples of a select gender, such as women, or samples that represent a union or intersection of different categorizations, such as samples that represent a select ethnic and gender category. In these examples, each of the first training set 130, second training set 150, and third training set 170 each represent different types of training sets, with each type focusing on different delineating or categorized characteristics of facial images.

In addition, each of the training sets may themselves include sub-categorized facial images of the broader category of the corresponding training set, for further delineating between the sample facial images of the corresponding training set. For example, the second training set 150 is further classified or includes a sub-classification associated with a person's occupation including, but not limited to, a sports players 160 that is a specific type based on specific sport occupations, such as a hockey player, a basketball player, a boxer, a baseball player, and the like. In addition, or in other embodiments, the first training set 130 and/or the third training set 170 may similarly include one or more sub-categories of facial images for different sports occupations, again using sports as only an example.

A positioning model may be trained based on facial image samples included in the different types of training sets 130, 150, and 170.

Figure 2:
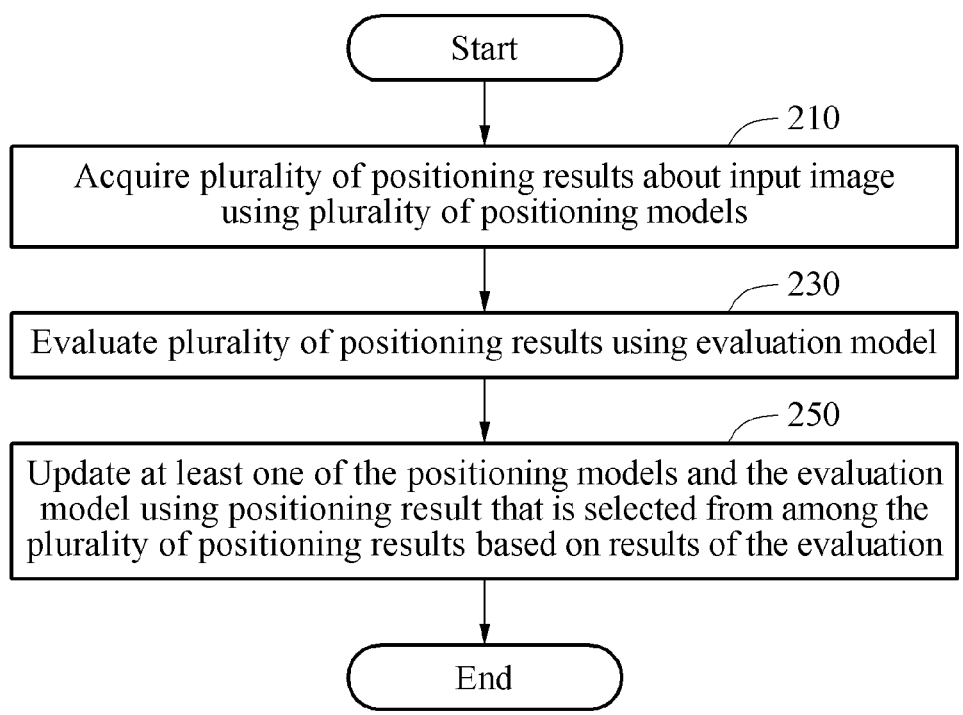
FIG. 2 is a flowchart illustrating an example of a positioning method.

FIG. 2 is a flowchart illustrating an example of a positioning method.

Referring to FIG. 2, in operation 210, a positioning apparatus according to an example acquires a plurality of positioning results using a plurality of predetermined positioning models. Here, the plurality of predetermined positioning models may respectively be trained models or representative facial models that are statistically determined, e.g., instead of being trained. The plurality of positioning results include results of the determined positions of key points of a facial area, included in an input image, respectively derived using the respective positioning models. As only an example and for convenience, operations of the positioning method of FIG. 2 are described by referring to corresponding operations of a positioning apparatus, such as any combination of the position apparatuses of FIGS. 14-16, though it is noted that embodiments are not limited thereto. In addition, one or more processing devices of such a positioning apparatus may be configured to respectively implement each, any combination, or all of such operations.

The positioning models may be trained using different types of training sets including a plurality of facial image samples, such as the example different types of training sets 130-170 of FIG. 1, as only examples. Thus, the positioning models correspond to the different types of training sets including facial image samples, respectively. For example, if the number of types of training sets is K, positioning models $A_1$ to $A_K$ correspond to the K types of training sets, respectively.

For example, a method of training, e.g., by the positioning apparatus, of a plurality of positioning models will be described with reference to FIG. 6.

In operation 210, the positioning apparatus maps or normalized the input image with respect to each of the trained positioning models, and acquires positions of key points of a facial area corresponding to the respective key points of each of the positioning models as the plurality of positioning results. Here, for example, a positioning result acquired by a positioning apparatus will be described with reference to FIG. 7.

In operation 230, the positioning apparatus evaluates the plurality of positioning results acquired in operation 210, using an evaluation model about positions of key points. The evaluation model may include a plurality of classifiers trained in correspondence to the respective key points. For example, a method of evaluating, e.g., by a positioning apparatus, a plurality of positioning results will be described with reference to FIG. 8.

In operation 250, the positioning apparatus updates at least one of the positioning models and the evaluation model using a positioning result that is selected from among the plurality of positioning results based on the evaluation result of operation 230. For example, a method of updating, e.g., by a positioning apparatus, at least one of plural positioning models and an evaluation model will be described with reference to FIG. 10.

Figure 3:
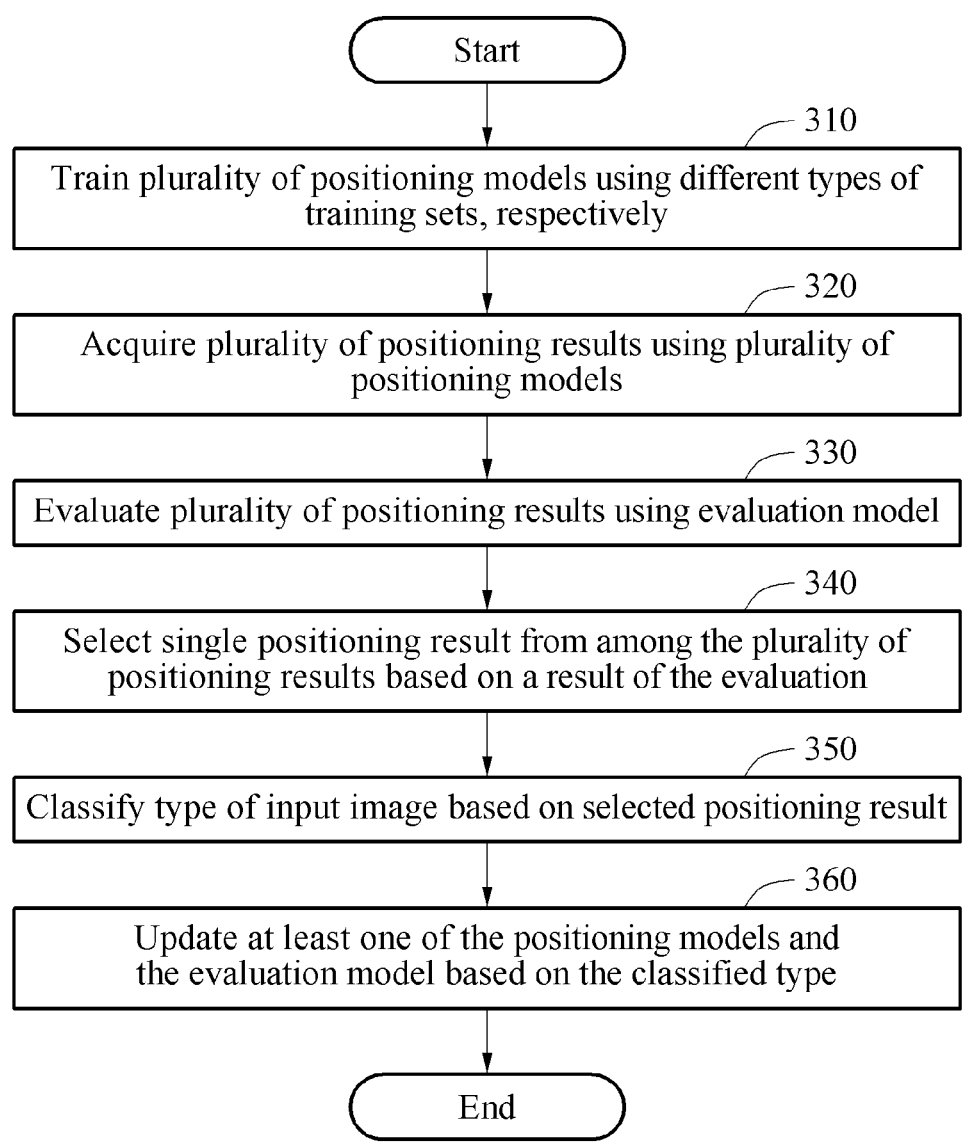
FIG. 3 is a flowchart illustrating an example of a positioning method.

FIG. 3 is a flowchart illustrating an example of a positioning method.

Referring to FIG. 3, in operation 310, a positioning apparatus trains a plurality of positioning models using different types of training sets including facial image samples, respectively. As only an example and for convenience, below, operations of the positioning method of FIG. 3 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

In operation 320, the positioning apparatus acquires a plurality of positioning results using the plurality of positioning models. Each of the positioning results includes determined positions of key points of a facial area included in an input image. The positions of key points include, for example, an eye rim/contour, a tip of an eyelash, a lip line or contour, and a tip of a nose.

In one example, based on the assumption that K (K≥1) positioning models $A_1$ to $A_K$ are used, a set of K positioning models may be indicated as set A.

The positioning apparatus acquires K positioning results by mapping the input image to correspond to K positioning models and by indicating positions of pixels corresponding to key points of each positioning model in the input image as (x,y).

The positioning apparatus may indicate the K positioning results as $s_1, s_2, \ldots, s_K$, respectively. Each of the positioning results may include L positions of key points of a face.

The positioning result (s) may be expressed as $s=\{x_1,y_1, x_2,y_2, \ldots, x_L,y_L\}$.

In one example, the positioning apparatus acquires positioning models $A_1$ to $A_K$ using a training set C ($C_1$ to $C_K$). Here, OK that is one of the training sets denotes a set including facial image samples and L positions of key points $s_1=\{x_{i1},y_{i1}, x_{i2},y_{i2}, \ldots x_{iL},y_{iL},\}$ are measured from each of the image facial samples $I_i$ included in the training set $C_K$.

Facial image samples included in the training set C ($C_1$ to $C_K$) may be classified into different types based on a variety of factors, for example, posture, facial expression, age, ethnicity, and social position, as only examples. The positioning apparatus acquires the plurality of positioning models $A_1$ to $A_K$ using the different types of training sets.

In operation 330, the positioning apparatus evaluates the plurality of positioning results acquired in operation 320, using an evaluation model about the positions of key points.

The positioning apparatus acquires a best positioning result by evaluating the plurality of positioning results using classifiers trained with respect to facial key points.

The positioning apparatus may acquire L classifiers ($h_1, h_2, \ldots, h_L$) by training a single boost classifier with respect to the respective key points. Here, the L classifiers may configure an evaluation model E.

In operation 340, the positioning apparatus selects a single positioning result from among the plurality of positioning results acquired in operation 320, based on the evaluation result of operation 330. The positioning result selected in operation 340 may be referred to as a 'best positioning result'.

In operation 350, the positioning apparatus classifies a type of the input image based on the positioning result selected in operation 340.

In operation 360, the positioning apparatus updates at least one of the positioning models and the evaluation model based on the type of the input image classified in operation 350. For example, a method of updating, by a positioning apparatus, a positioning model based on a classified type will be described with reference to FIG. 11 and a method of updating, by a positioning apparatus, an evaluation model will be described with reference to FIG. 12.

Figure 4:
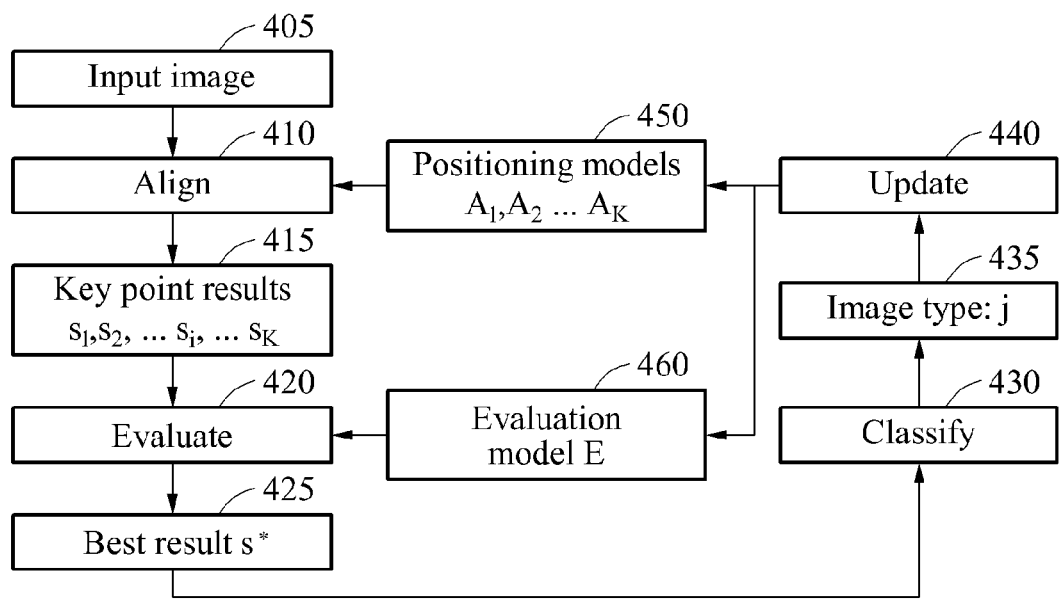
FIG. 4 is a diagram illustrating example processes of a positioning method.

FIG. 4 illustrates example processes of a positioning method. As only an example and for convenience, below, operations of the positioning method of FIG. 4 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 4, when a single input image is input in operation 405, the positioning apparatus aligns all of positioning models $A_1$ to $A_K$ 450 with respect to the input image in operation 410. The positioning models may correspond to different types of training sets including facial image samples, respectively.

In operation 415, the positioning apparatus acquires a plurality of positioning results $s_1, s_2, \ldots, s_K$ with respect to positions of key points in a facial area of the input image corresponding to key points from each of the positioning models $A_1$ to $A_K$.

The positioning apparatus evaluates the plurality of positioning results $s_1, s_2, \ldots, s_K$ using an evaluation model 460 in operation 420, and selects a best positioning result s* 425 from among the plurality of positioning results $s_1, s_2, \ldots, s_K$ in operation 425. Here, the best positioning result s* may correspond to, or be based on, positions of optimal key points in the facial area of the input image.

The positioning apparatus generates a confidence coefficient, which may be made available to an application in an electronic device embodiment, for example, a facial recognition application or implementation in the electronic device embodiment, based on the plurality of positioning results $s_1, s_2, \ldots, s_K$.

The positioning apparatus classifies an image type, that is, a type of the input image based on the best positioning result s* in operation 430, and searches for a positioning model most similar to the classified type of the input image in operation 435.

In operation 440, the positioning apparatus updates at least one of the positioning models 450 and the evaluation model 460 based on the classified type of the input image.

Figure 5:
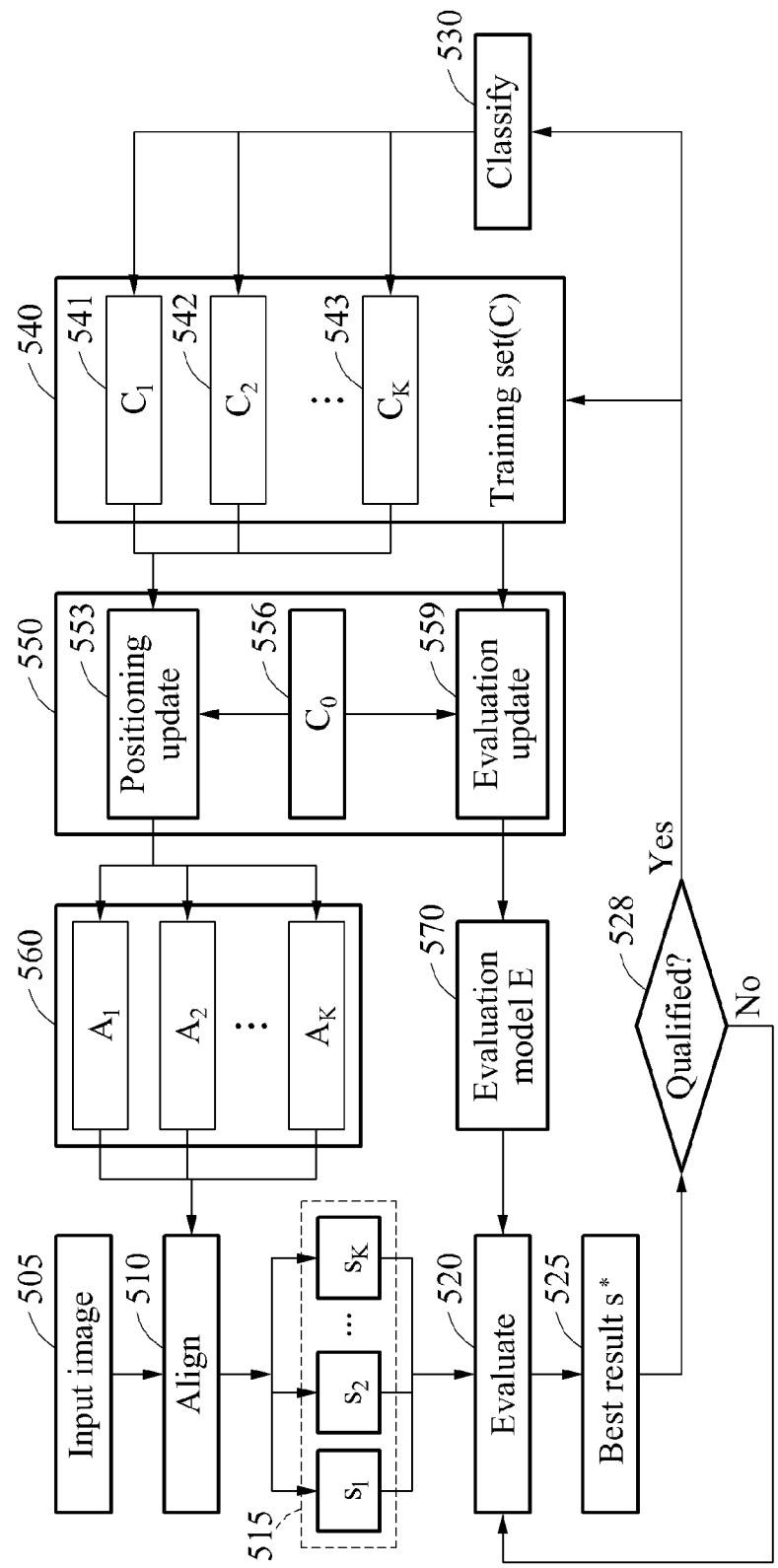
FIG. 5 is a diagram illustrating example processes of a positioning method.

FIG. 5 illustrates example processes of a positioning method. As only an example and for convenience, below, operations of the positioning method of FIG. 5 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Operations 505 through 525 of FIG. 5 are the same as, or similar to, operations 405 through 425 of FIG. 4, and thus the corresponding description of FIG. 4 is not repeated here for brevity.

In operation 528, the positioning apparatus qualifies the selected positioning result s*, that is, the best positioning result s*.

When the qualification result of operation 528 is inappropriate, the positioning apparatus evaluates again the plurality of positioning results $s_1, s_2, \ldots, s_K$ in operation 520.

Conversely, when the qualification result of operation 528 is appropriate, the positioning apparatus classifies a type of the input image based on the selected positioning result s* in operation 530.

In operation 540, the positioning apparatus may update at least one of positioning models 560 and an evaluation model 570 based on the classified type of the input image.

When the classified type of operation 530 corresponds to a single type, for example, a type of $A_K$ among types of original positioning models, the positioning apparatus adds the classified input image to a training set C 540 corresponding to the classified type. The training set C may include sub-training sets $C_1$ 541, $C_2$ 542, ..., $C_K$ 543.

The training set C 540 may ultimately include all of images that are input from a user.

The sub training sets $C_1$ 541, $C_2$ 542, ..., $C_K$ 543 include different types of facial images samples, for example, respective posture, lightness, and ethnicity types.

The training set C 540 and a general training set $C_0$ 556 may be used to update the evaluation model 570. Each of the sub training sets $C_1$ 541, $C_2$ 542, ..., $C_K$ 543 and the general training set $C_0$ 556 may be used to update the positioning models 560.

The general training set $C_0$ 556 may be pre-stored in the memory of the positioning apparatus and the like as a general training database used for training. For example, the general training set $C_0$ 556 may be used for training an initial positioning model.

Figure 6:
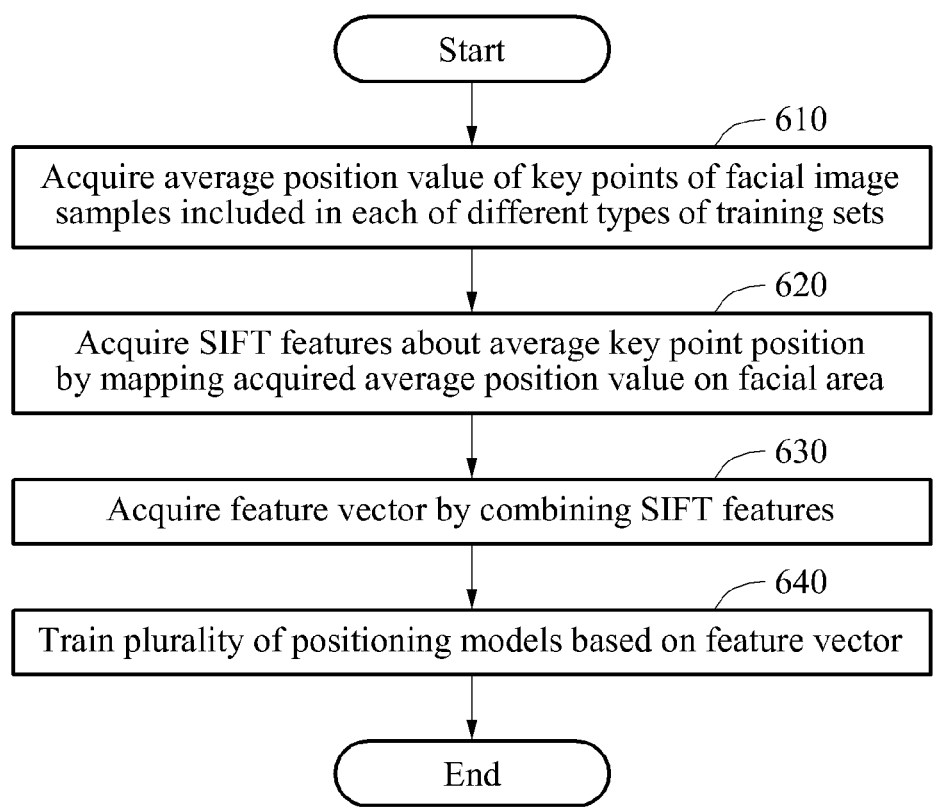
FIG. 6 is a flowchart illustrating an example of a method of training a plurality of positioning models.

FIG. 6 is a flowchart illustrating an example of a method of training a plurality of positioning models. As only an example and for convenience, below, operations of the positioning method of FIG. 6 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 6, in operation 610, the positioning apparatus acquires an average position value of key points of facial image samples included in each of different types of training sets.

For example, when training positioning models $A_1$ to $A_K$, the positioning apparatus acquires an average position value $S^0$ of key points, that is, an average key point position, with respect to the entire facial image samples included in a training set C according to the below Equation 1, for example.

$$s^0 = \frac{1}{|C|} \sum_{s_i \in C} s_i \qquad \text{Equation 1}$$

In Equation 1, |C| denotes the number of facial image samples included in the training set C, and $s_i$ denotes a positioning result.

In operation 620, the positioning apparatus acquires scale invariant feature transform (SIFT) features about the average key point position of operation 610 by mapping the acquired average position value on a facial area of an input image. Here, the positioning apparatus acquires an SIFT feature of each position over the average key point position $S^0$ of operation 610 by disposing the acquired average key point position $S^0$ at the center of the facial area of the input image with respect to each facial image sample included in the training set C.

In operation 630, the positioning apparatus acquires a feature vector $f_i$ by combining the SIFT features acquired in operation 620.

The positioning apparatus configures a regression model as expressed by the below Equation 2, for example, with respect to the entire facial image samples included in the training set C, based on the feature vector $f_i$.

$$f_i \cdot A = s_i - s^0 \qquad \text{Equation 2:}$$

In Equation 2, the set A denotes a set of positioning models acquired based on the training set C.

In operation 640, the positioning apparatus trains the plurality of positioning models based on the feature vector acquired in operation 630. Accordingly, the positioning apparatus acquires a positioning result set s including K positioning results as expressed by the below Equation 3, for example.

$$s = s^0 + f \cdot A \qquad \text{Equation 3:}$$

Through the above method, the positioning apparatus acquires a plurality of positioning results about positions of key points of the input image from the trained plurality of positioning models.

Figure 7A:
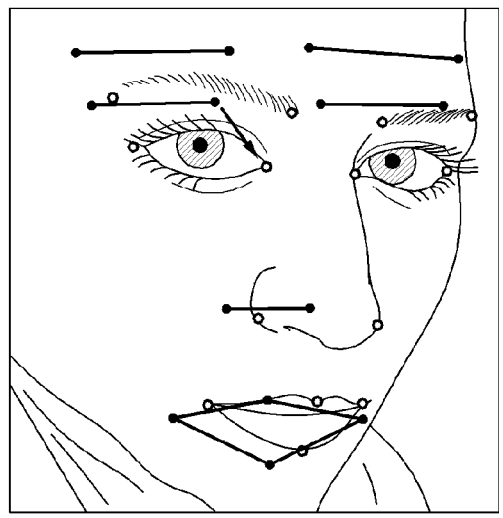
FIGS. 7A-7B illustrate an example of a position corresponding to an average position value of key points used in a positioning method and a positioning result.
Figure 7B:
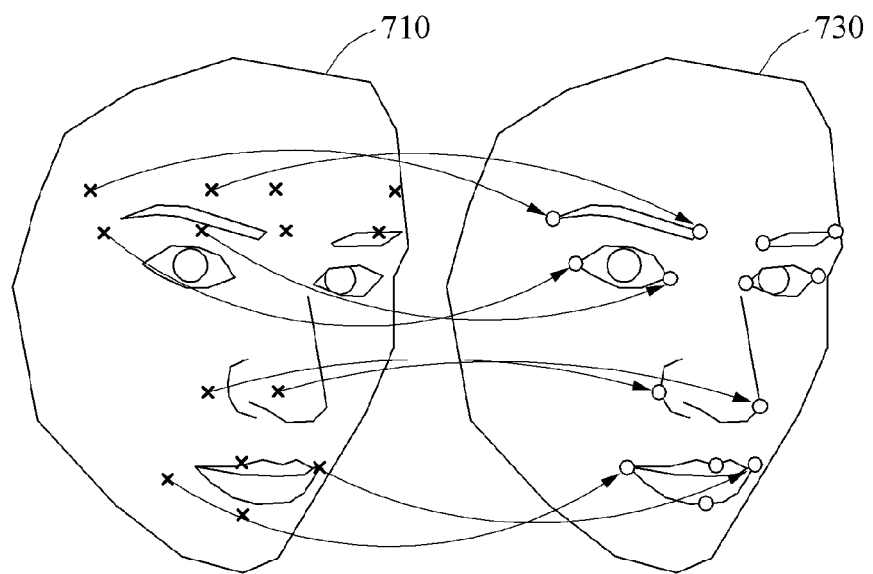

FIGS. 7A-7B illustrate an example of a position corresponding to an average position value of key points used in a positioning method and a positioning result.

FIG. 7B illustrates an image 710 in which an average position value $S^0$ of key points with respect to the entire sample images included in a training set C is indicated and an image 730 showing a positioning result.

In the image 710, the mark "X" denotes an average position value of key points, that is, an average key point position, with respect to the entire sample images included in the training set.

In the image 730 of FIG. 7B and in FIG. 7A, the mark "○" denotes a position of a key point in a facial area of an input image corresponding to the average key point position.

As demonstrated in FIG. 7A, the positioning apparatus acquires a feature vector by combining the SIFT features that are acquired by disposing the average key point position at the center of the facial area of the input image. The positioning apparatus may acquire the positioning result using positioning models trained based on the acquired feature vector.

The positioning result of FIG. 7A shows that an average key point position matches an actual key point position in the facial area.

Figure 8:
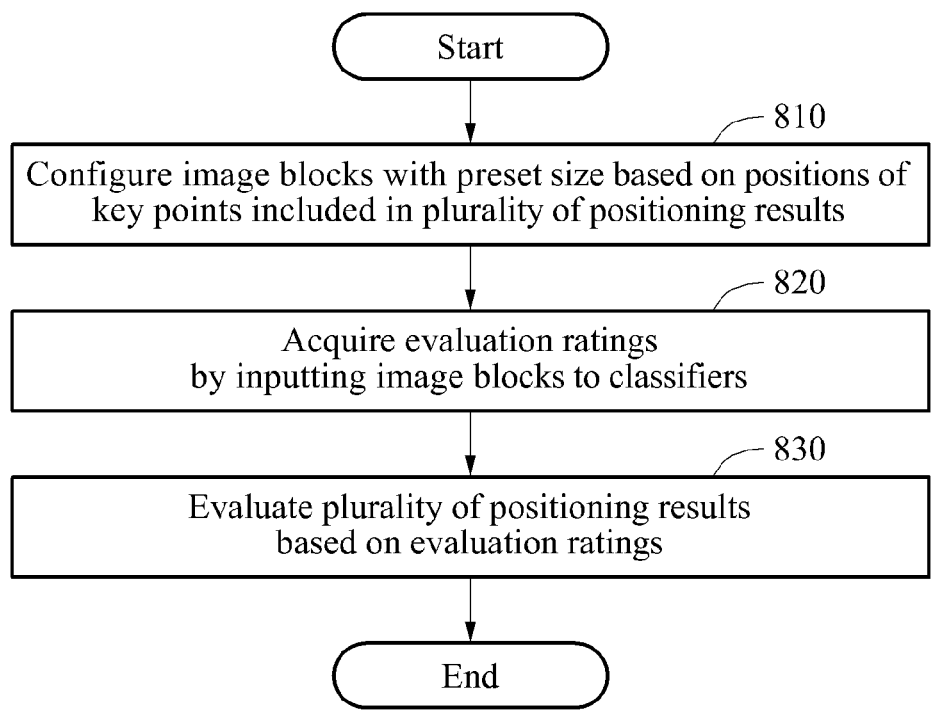
FIG. 8 is a flowchart illustrating an example of a method of evaluating a plurality of positioning results.

FIG. 8 is a flowchart illustrating an example of a method of evaluating a plurality of positioning results. As only an example and for convenience, below, operations of the positioning method of FIG. 8 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 8, in operation 810, the positioning apparatus configures image blocks with a preset size based on positions of key points included in a plurality of positioning results.

Figure 9:
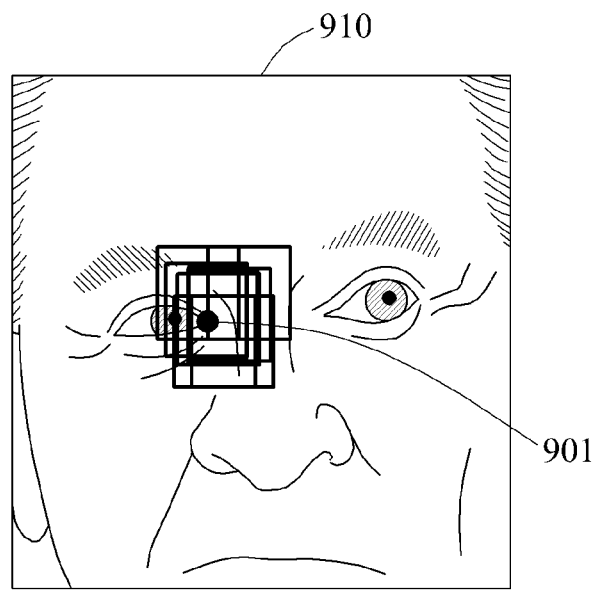
FIG. 9 illustrates an example of a positive sample image block and a negative sample image block used in a positioning method.
Figure 9:
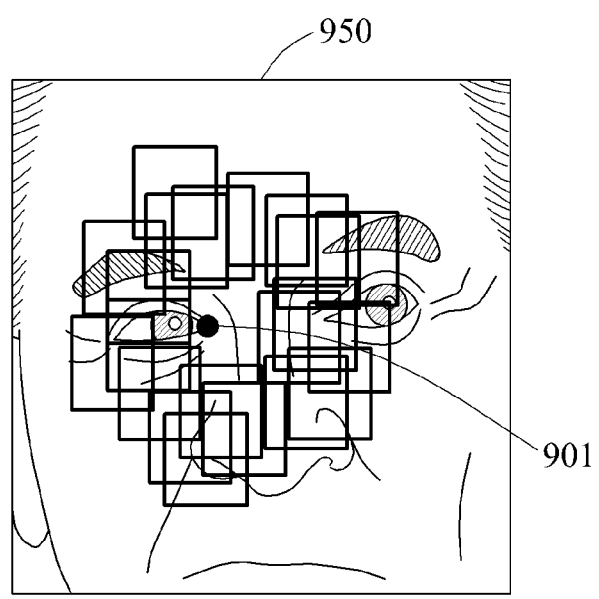

In this example, the positioning apparatus may configure positive sample image blocks and negative sample image blocks based on the positions of key points, such as illustrated in FIG. 9.

The positive sample image block may be understood as an image block in which a distance between a center position of the image block and a position of a key point is within a preset distance. The negative sample image block may be understood as an image block in which a distance between a center position of an image block and a position of a key point is outside a preset distance.

In operation 820, the positioning apparatus acquires evaluation ratings by inputting the image blocks of operation 810 to classifiers.

In operation 830, the positioning apparatus evaluates the plurality of positioning results based on the evaluation ratings acquired in operation 820.

FIG. 9 illustrates an example of a positive sample image block and a negative sample image block used in a positioning method. As only an example and for convenience, below, operations of the positioning method of FIG. 9 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

FIG. 9 illustrates an image 910 in which positive sample image blocks are illustrated and an image 950 in which negative sample image blocks are illustrated.

When training classifiers, the positioning apparatus sets, as a positive sample, an image block adjacent to a position of a key point among facial image samples included in a training set. Here, "being adjacent to a position of a key point" may be understood to mean that a distance between a center position of an image block and the position of the key point is within a preset distance.

The positioning apparatus sets, as a negative sample, an image block distant from a position of a key point among facial image samples included in the training set. Here, "being distant from a position of a key point" may be understood to mean that a distance between a center position of an image block and the position of the key point is outside a preset distance.

The positioning apparatus trains the classifiers using such positive sample image blocks and negative sample image blocks.

For example, it is assumed that the positioning apparatus trains the classifiers with respect to a key point 901 of a left eye rim or contour.

The positioning apparatus may set image blocks indicated in a rectangular shape as positive sample image blocks of the classifiers in the image 910 and may set image blocks indicated in a rectangular shape as negative sample image blocks of the classifiers in the image 950.

In one example, a classifier $h_j$ is trained in correspondence to each of key points and includes a plurality of selectors $h_{sel}$.

Each selector $h_{sel}$ evaluates an input image block by selecting a weak Haar classifier $h_w$. Output of each classifier $h_j$ may be a weighted sum of the entire selectors $h_{sel}$ as expressed by the below Equation 4, for example.

$$h_j(x) = \sum_n \alpha_n h_n^{sel}(x) \qquad \text{Equation 4}$$

In Equation 4, $a_n$ denotes a weight and x denotes an image block.

The positioning apparatus acquires classifiers capable of evaluating positions of key points by training the classifiers using positive sample image blocks and negative sample image blocks included in a training set.

For example, when evaluating a positioning result $s_i$ of a key point, such as in FIG. 8, the positioning apparatus acquires a single set of evaluation ratings $h_j(x_j, y_j)$ by inputting an image block with a preset size based on a position $(x_j, y_j)$ of each key point to a corresponding key point classifier $h_j$.

The entire or all classifiers acquire evaluation ratings about the positioning results $s_j$ and also acquire the average ratings of the positioning results as expressed by the below Equation 5, for example.

$$\text{score}(s_k) = \frac{1}{L}\sum_{j=1}^{L} h_j(x_{kj} \cdot y_{kj}) \qquad \text{Equation 5}$$

In Equation 5, L denotes the number of facial key points.

The positioning apparatus acquires evaluation ratings of each of positioning results included in K positioning results $s_1, s_2, \ldots, s_K$ and selects a best positioning result s*. For example, the positioning apparatus selects a positioning result corresponding to highest evaluation ratings and sets the selected positioning result as the best positioning result about a position of a facial key point.

Depending on examples, the positioning apparatus may evaluate a positioning result acquired based on a positioning model by applying a variety of evaluation technologies.

Figure 10:
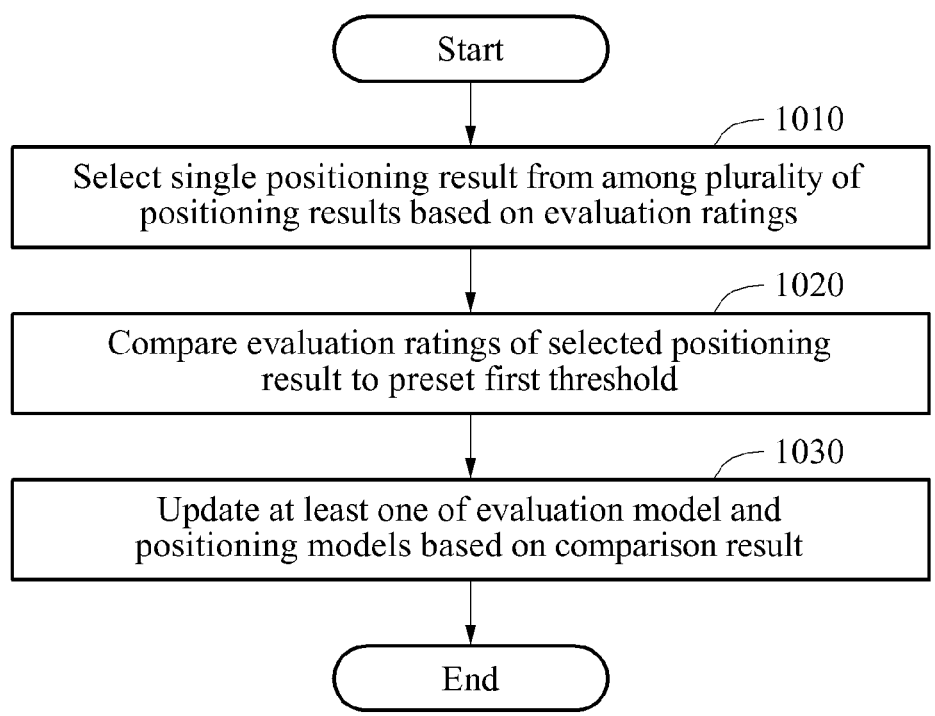
FIG. 10 is a flowchart illustrating an example of a method of updating at least one of a positioning model and an evaluation model.

FIG. 10 is a flowchart illustrating an example of a method of updating at least one of a positioning model and an evaluation model. As only an example and for convenience, below, operations of the positioning method of FIG. 10 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 10, in operation 1010, the positioning apparatus selects a single positioning result from among the plurality of positioning results based on the evaluation ratings acquired in operation 820 of FIG. 8.

In operation 1020, the positioning apparatus compares evaluation ratings of the positioning result selected in operation 1010 to a preset first threshold.

In operation 1030, the positioning apparatus updates at least one of an evaluation model and positioning models based on the comparison result of operation 1020. For example, a method of updating, by a positioning apparatus, positioning models will be described with reference to FIG. 11 and a method of updating, by a positioning apparatus, an evaluation model will be described with reference to FIG. 12.

Figure 11:
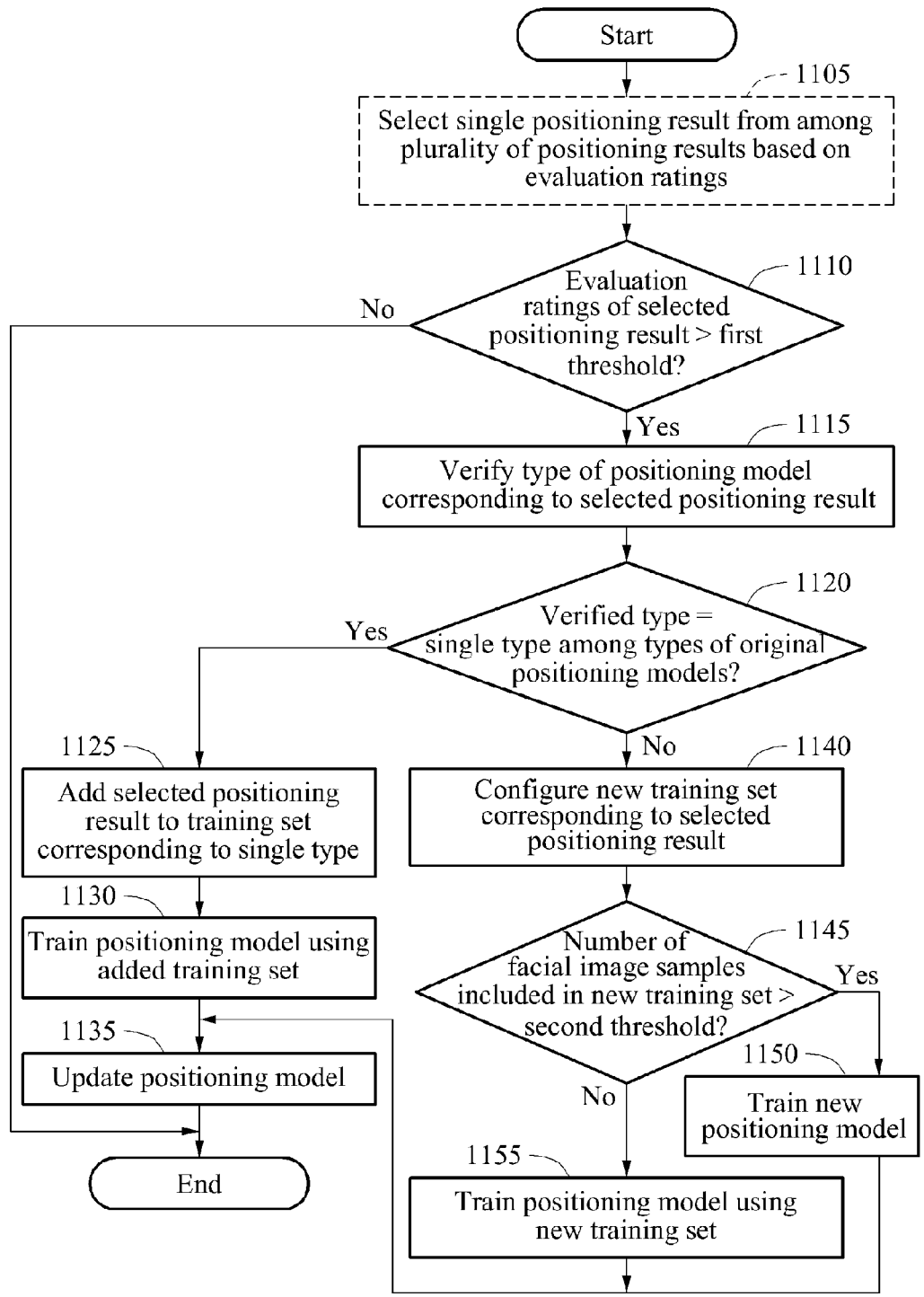
FIG. 11 is a flowchart illustrating an example of a method of updating a positioning model.

FIG. 11 is a flowchart illustrating an example of a method of updating a positioning model. As only an example and for convenience, below, operations of the positioning method of FIG. 11 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 11, when a single positioning result is selected in operation 1105 similar to operation 1010 of FIG. 10, the positioning apparatus determines whether evaluation ratings of the selected positioning result exceeds a first threshold in operation 1110. Here, that "evaluation ratings of a positioning result exceeds a first threshold" may indicate the presence of a new positioning result. Thus, the positioning apparatus determines whether the new position result is present.

When the evaluation ratings of the positioning result does not exceed the first threshold in operation 1110, the positioning apparatus terminates a process.

Conversely, when the evaluation ratings of the positioning result exceeds the first threshold in operation 1110, the positioning apparatus verifies or determines a type of a positioning model corresponding to the selected positioning result, that is, the best positioning result s* in operation 1115. Here, the positioning apparatus may search for a type of a positioning model corresponding to the selected positioning result s* using an online K averaging method based on a feature vector f corresponding to the selected positioning result s*.

In operation 1120, the positioning apparatus determines whether the verified type of the positioning model corresponds to a single type, for example, a type of $A_K$, among types of original K positioning models.

When the verified type is determined to correspond to the single type, for example, the type of $A_K$ among the types of the original K positioning models in operation 1120, the positioning apparatus adds the selected positioning result s* to a training set $C_K$ corresponding to the single type, for example, the type of $A_K$ in operation 1125.

In operation 1130, the positioning apparatus trains again the positioning model $A_K$ using the training set $C_K$ to which the selected positioning result is added.

In operation 1135, the positioning apparatus updates the positioning model $A_K$ using the training result of operation 1130.

Conversely, when the verified or determined type is determined to not correspond to any of the types of the example original K positioning models in operation 1120, the positioning apparatus configures a new training set $C_{K+1}$ corresponding to the selected positioning result s* in operation 1140.

In operation 1145, the positioning apparatus determines whether the number of facial image samples included in the new training set $C_{K+1}$ exceeds a preset second threshold.

When the number of facial image samples included in the new training set $C_{K+1}$ is determined to exceed the second threshold in operation 1145, the positioning apparatus trains a new positioning model ($A_{K+1}$) based on facial image samples included in the new training set in operation 1150. Accordingly, the number of example original positioning models increases to be from K to K+1. When the number of positioning models increases, the number of original positioning results also increases to be from K to K+1.

Conversely, when the number of facial image samples included in the new training set $C_{K+1}$ is determined to not exceed the second threshold in operation 1145, the positioning apparatus trains the positioning model using the new training set in operation 1155.

In operation 1135, the positioning apparatus updates the new positioning model $A_{K+1}$ based on the training result of operation 1155.

In one example, when the new training set $C_{K+1}$ is configured by adding a new facial image sample s* to the original training set C, the positioning model A may be updated as follows.

The positioning model A before updating may be expressed as in the below Equation 6, for example.

$$F \cdot A = S - S^0 \qquad \text{Equation 6:}$$

In Equation 6, F denotes a matrix in which the entire sample feature vectors f of sample images included in the training set C are formed. An i-th row of F denotes a feature vector of an i-th sample. Further, S denotes a matrix in which positions of key points directly measured from the entire facial image samples included in the training set C are formed. An i-th row of S denotes a position of a key point of an i-th facial image sample. $S^0$ denotes a matrix in which an average key point position of the entire samples included in the training set C is formed. An i-th row of $S^0$ denotes an average key point position of an i-th sample.

The positioning model A may be acquired by applying a least square method to Equation 6, and may be expressed by the below Equation 7, for example.

$$A = (F^T F)^{-1} \cdot F \cdot (S - S^0) \qquad \text{(Equation 7:}$$

In Equation 7, covariance matrices may be expressed by $Cov_{xx} = F^T F$, $Cov_{xy} = F(S - S^0)$.

Elements corresponding to an m-th row and an n-th column of the covariance matrices $Cov_{xx}$ and $Cov_{xy}$ may be expressed by the below Equation 8, for example.

$$Cov_{xx}(m, n) = \sum_{S_i \in C} f_{im} f_{in}(m, n), \qquad \text{Equation 8}$$

$$Cov_{xy}(m, n) = \sum_{S_i \in C} f_{im}(s_{in} - s_{in}^0)$$

In Equation 8, $f_{im}$ denotes an m-th dimension value of an i-th facial image sample included in the training set. $S_{in}$ denotes an n-th dimension value corresponding to a position of a key point manually measured from an i-th sample included in the training set, and $S_{in}^0$ denotes an n-th dimension value corresponding to an average key point position of an i-th facial image sample included in the training set.

When the facial image sample s* is newly added, elements of the covariance matrices may be updated with the below Equation 9, for example.

$$Cov_{xx}(m, n) = \sum_{S_i \in C} f_{im} f_{in} + f_m^* f_n^*, \qquad \text{Equation 9}$$

$$Cov_{xy}(m, n) = \sum_{S_i \in C} f_{im}(s_{in} - s_{in}^0) + f_m^*(s_n^* - s_n^{*0})$$

In Equation 9, $f_m^*$ denotes an m-th dimension value of a feature vector of the new sample, $S_n^0$ denotes an n-th dimension value corresponding to a key point manually measured from the new sample, and $S_n^{*0}$ denotes an n-th dimension value corresponding to an average key point position of the new sample.

Figure 12:
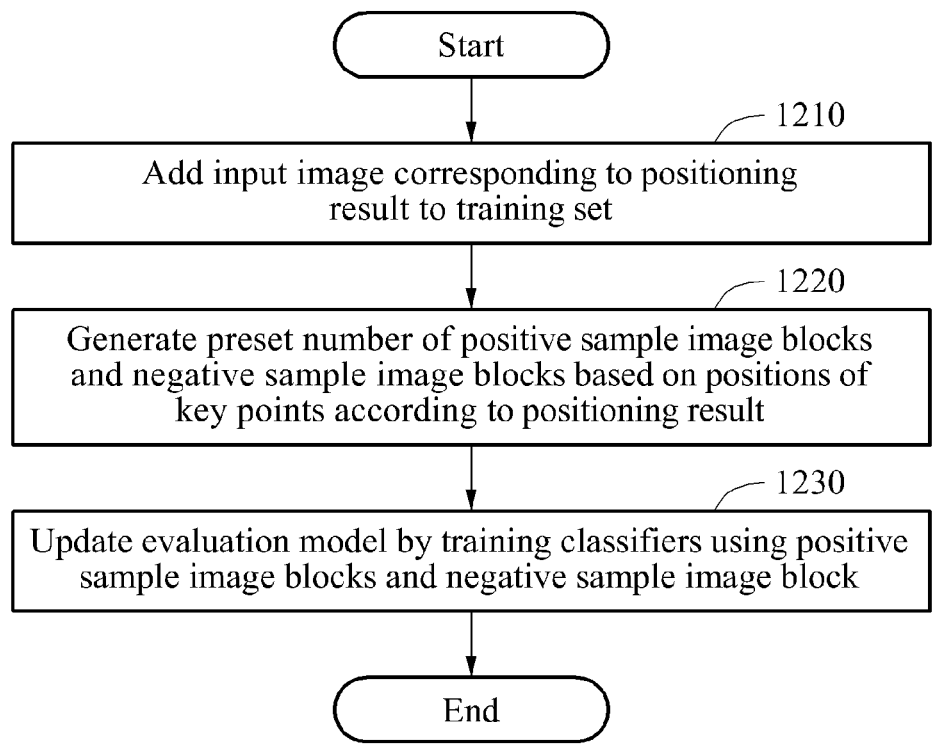
FIG. 12 is a flowchart illustrating an example of a method of updating an evaluation model.

FIG. 12 is a flowchart illustrating an example of a method of updating an evaluation model. As only an example and for convenience, below, operations of the positioning method of FIG. 12 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 12, in operation 1210, the positioning apparatus adds, for example, an input image corresponding to the positioning result s* selected in operation 1010 of FIG. 10, for example, to a training set.

In operation 1220, the positioning apparatus generates a preset number of positive sample image blocks and negative sample image blocks based on positions of key points according to the selected positioning result s*. Here, the positions of key points according to the positioning result may be understood as positions of key points in the positioning result.

The positioning apparatus generates, for example, ten positive sample image blocks and ten negative sample image blocks based on positions of L key points in the positioning result.

In operation 1230, the positioning apparatus updates an evaluation model by training L classifiers $h_1, h_2, \ldots h_L$ using the positive sample image blocks and the negative sample image blocks generated in operation 1220. Here, the positioning apparatus trains key point classifiers using, for example, an online AdaBoost method.

Figure 13:
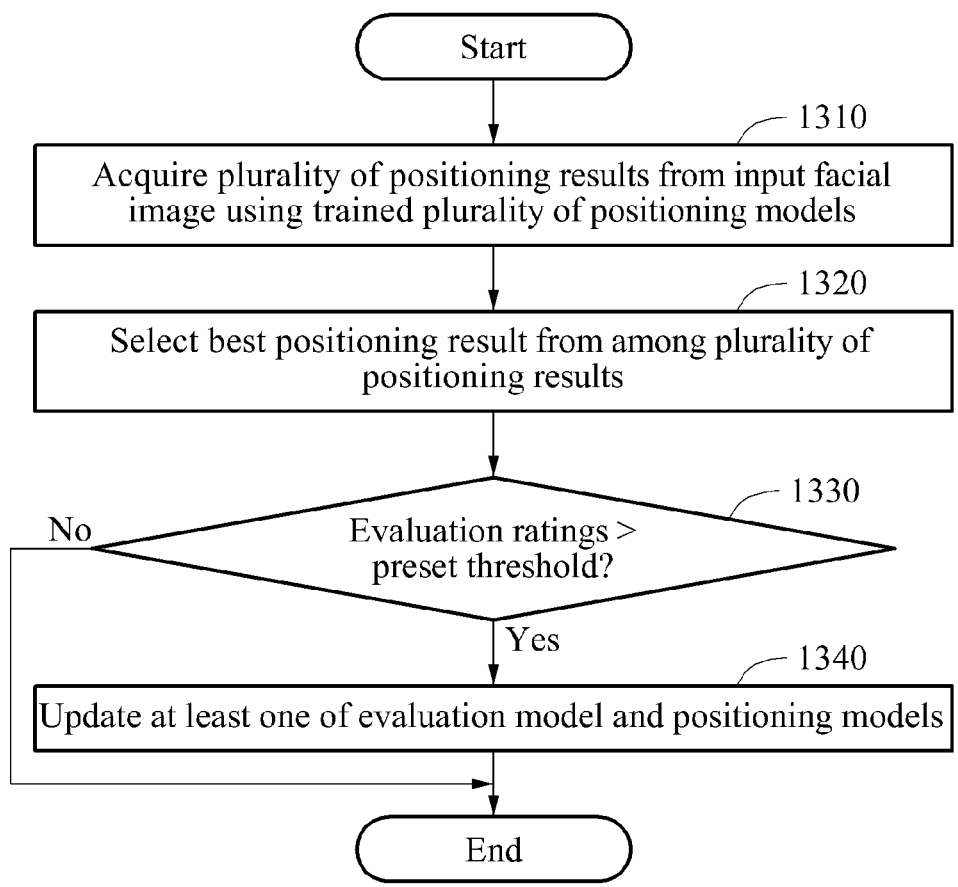
FIG. 13 is a flowchart illustrating an example of a positioning method.

FIG. 13 is a flowchart illustrating an example of a positioning method. As only an example and for convenience, below, operations of the positioning method of FIG. 13 may be described by referring to corresponding operations of a positioning apparatus, such as any combination of the position apparatuses of FIGS. 14-16, though it is noted that embodiments are not limited thereto. One or more processing devices of such a positioning apparatus may be configured to respectively implement each, any combination, or all of such operations.

Referring to FIG. 13, in operation 1310, the positioning apparatus acquires a plurality of positioning results from an input facial image using a trained plurality of positioning models.

In operation 1320, the positioning apparatus selects a best positioning result from among the plurality of positioning results acquired in operation 1310. Here, the positioning apparatus selects the best positioning result from among the plurality of positioning results by evaluating the plurality of positioning results acquired in operation 1310.

In operation 1330, the positioning apparatus determines whether evaluation ratings of the selected best positioning result exceeds a preset threshold.

When the evaluation ratings of the best positioning result is determined to exceed the preset threshold in operation 1330, the positioning apparatus may updates at least one of an evaluation model and the positioning models based on the best positioning result in operation 1340.

Conversely, when the evaluation ratings of the best positioning result is determined to not exceed the preset threshold in operation 1330, the positioning apparatus terminates a process.

Figure 14:
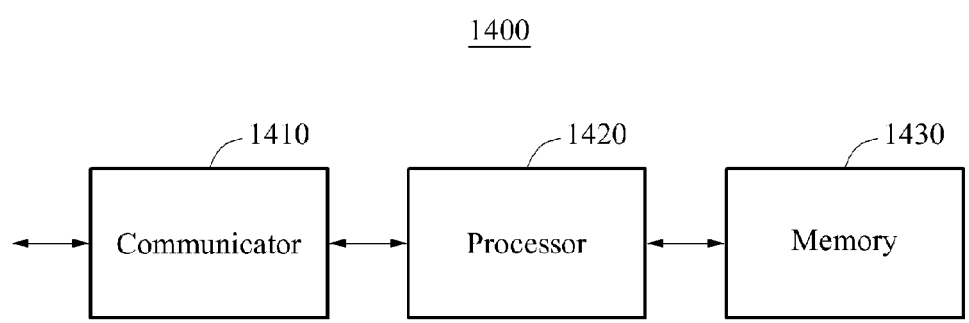
FIG. 14 is a block diagram illustrating an example of a positioning apparatus.

FIG. 14 is a block diagram illustrating an example of a positioning apparatus.

Referring to FIG. 14, a positioning apparatus 1400 includes a communicator 1410, a processor 1420, and a memory 1430.

The communicator 1410 receives an input image. As only an example, the communicator 1410 may represent a camera, memory that stores input image(s), and/or communication hardware to receive provided input images from an exterior or distant image capturing, provider, or server device, for example.

The processor 1420 acquires a plurality of positioning results including positions of key points of a facial area included in the input image received at the communicator 1410, using positioning models stored in the memory 1430. As noted above, the processor 1420 may represent one or more processing devices, such as one or more processors, computers, or other hardware processing devices. The processor 1420 may be configured to implement any or any combination of the operations described above with regard to FIGS. 1-13.

The processor 1420 selects a single positioning result from among the plurality of positioning results based on a result of an evaluating of the plurality of positioning results using an evaluation model, and updates at least one of the positioning models and the evaluation model based on the selected positioning result. The evaluation model relates to positions of key points.

The memory 1430 stores a plurality of predetermined positioning models. Here, the plurality of predetermined positioning models may be trained models or representative face models that are statistically determined, instead of being trained. The memory may further store processor or computer readable code to control the processor 1420 to implement one or more, or any combination, of the operations and methods described herein.

The processor 1420 configures image blocks with a preset size based on positions of key points included in the plurality of positioning results. The processor 1420 acquires evaluation ratings by inputting the image blocks to the plurality of classifiers trained in correspondence to the respective key points. The processor 1420 evaluates the plurality of positioning results based on the evaluation ratings.

The processor 1420 selects a single positioning result from among the plurality of positioning results based on the evaluation ratings. The processor 1420 updates at least one of the evaluation model and the positioning models based on a result of comparing the evaluation ratings of the selected positioning result to a preset threshold, for example, a first threshold.

In one or more embodiments, and only as an example, an additional operation of the processor 1420 includes performing facial recognition of an input image based upon results of the positioning or evaluation models. Accordingly, with one or more positioning examples herein, through implementation of such one or more positioning examples there may be improvements to computer technology over previous computer technology approaches, such as with greater efficiencies and/or accuracies in determining positions with respect to key points of a face, such as for improved face recognition or other implementing embodiments.

Figure 15:
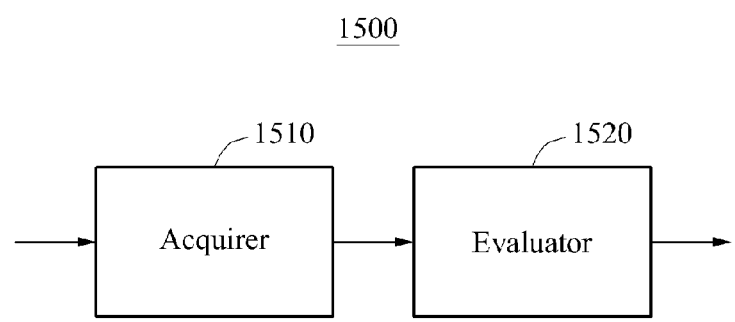
FIG. 15 is a block diagram illustrating an example of a positioning apparatus.

FIG. 15 is a block diagram illustrating an example of a positioning apparatus.

Referring to FIG. 15, a positioning apparatus 1500 includes an acquirer 1510 and an evaluator 1520. The acquirer 1510 and the evaluator 1520 may be processing devices, such as respective (or collectively) one or more processors, computers, or other hardware processing devices. Such processing devices may be configured to respectively implement any or any combination of the corresponding operations described above with regard to FIGS. 1-13.

The acquirer 1510 acquires a plurality of positioning results corresponding to the respective positioning models by positioning a facial area included in an input image using the plurality of positioning models. The plurality of positioning models may be about a face trained based on different types of training sets. The plurality of positioning models may correspond to the different types of training sets, respectively.

The evaluator 1520 selects a best positioning result by evaluating the plurality of positioning results acquired at the acquirer 1510, using a trained evaluation model.

The evaluation model used at the evaluator 1520 may be configured using classifiers trained with respect to positions of key points included in a facial image. Each classifier evaluates positions of key points corresponding to a positioning result.

When training classifiers, the positioning apparatus 1500 sets, as a positive sample, an image block adjacent to a position of a key point and sets, as a negative sample, an image block distant from a position of a key point, among facial image samples included in a training set.

Figure 16:
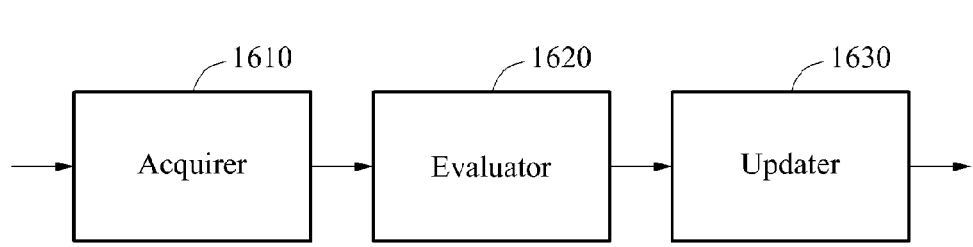
FIG. 16 is a block diagram illustrating an example of a positioning apparatus.

FIG. 16 is a block diagram illustrating an example of a positioning apparatus.

Referring to FIG. 16, a positioning apparatus 1600 includes an acquirer 1610, an evaluator 1620, and an updater 1630. The acquirer 1610, the evaluator 1620, and the updater 1630 may be processing devices, such as respective (or collectively) one or more processors, computers, or other hardware processing devices. Such processing devices may be configured to respectively implement any or any combination of the corresponding operations described above with regard to FIGS. 1-13.

The acquirer 1610 and the evaluator 1620 may operate in the same manner as the acquirer 1510 and the evaluator 1520 of FIG. 15, so a further description related thereto will be omitted here.

The updater 1630 updates an evaluation model used at the evaluator 1620 based on a best positioning result selected at the evaluator 1620.

In more detail, when evaluation ratings of the best positioning result selected at the evaluator 1620 is verified or determined to exceed a preset threshold, the updater 1630 updates the evaluation model based on the best positioning result.

When updating the evaluation model, the updater 1630 adds an input image corresponding to the best positioning result to a training set and generates a preset number of positive sample image blocks and negative sample image blocks based on positions of key points corresponding to the best positioning result. The updater 1630 updates the evaluation model by training classifiers included in the evaluation model using the generated positive sample image blocks and negative sample image blocks.

The updater 1630 updates the positioning models used at the acquirer 1610 based on the best positioning result selected at the evaluator 1620.

When a new positioning result of which evaluation ratings exceeds the preset threshold is verified to be present, the updater 1630 verifies a positioning model corresponding to the positioning result.

The updater 1630 searches for a type of a positioning model corresponding to the best positioning result based on a feature vector acquired by combining SIFT features, for example, using an online K averaging method.

When the best positioning result corresponds to a single type, for example, a type of $A_K$ among types of original K positioning models, the updater 1630 adds the best positioning result to a training set $C_K$ corresponding to the type of $A_K$. The updater 1630 updates the positioning model $A_K$ using the aforementioned positioning model training method.

Conversely, when the best positioning result does not correspond to one of the types of the original K positioning models, the updater 1630 configures a new training set $C_{K+1}$ corresponding to the best positioning result.

Here, when the number of facial image samples included in the new training set $C_{K+1}$ exceeds a preset threshold, for example, a second threshold, the updater 1630 trains a new positioning model $A_{K+1}$ using the new training set.

According to one or more examples, a stable positioning result may be acquired regardless of an effect by a factor such as a posture, a facial expression, lightness, and the like, by employing a plurality of positioning models.

According to one or more examples, it may be possible to select a best positioning result from among a plurality of positioning results based on an evaluation result using an evaluation model and to apply evaluation ratings acquired from the positioning result during various following processes, for example, a facial recognition process in a facial recognition embodiment.

The apparatuses, devices, and other components illustrated in FIGS. 14-16 that perform the operations described herein with respect to FIGS. 1-13 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute code, instructions, or software, such as an operating system (OS) and one or more software applications that run on the OS, to perform the operations described herein with respect to FIGS. 1-13. The hardware components also access, manipulate, process, create, and store data in response to execution of the code, instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described herein with respect to FIGS. 14-16 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A positioning method comprising:
   acquiring a plurality of positioning results including positions of key points of a facial area included in an input image, respectively using a plurality of predetermined positioning models;
   respectively mapping the input image to each of the plurality of predetermined positioning models;
   acquiring respective positions of the key points of the facial area corresponding to key points of each of the plurality of predetermined positioning models;
   evaluating the plurality of positioning results using an evaluation model of the positions of the key points of the facial area; and
   updating at least one of the plurality of predetermined positioning models and the evaluation model based on a positioning result that is selected, based on a result of the evaluating, from among the plurality of positioning results.

2. The positioning method of claim 1, wherein the plurality of predetermined positioning models correspond to respectively different types of training sets including facial image samples.

3. The positioning method of claim 1, further comprising:
   training positioning models using each of different types of training sets including facial image samples to respectively determine the plurality of predetermined positioning models.

4. The positioning method of claim 3, wherein the training of the positioning models comprises:
   acquiring an average position value of key points of the facial image samples included in each of the different types of training sets;
   acquiring scale invariant feature transform (SIFT) features about the average position value of key points of the facial image samples by mapping the average position value of key points to the facial area;
   acquiring a feature vector by combining the SIFT features; and
   training at least one of the positioning models based on the feature vector.

5. The positioning method of claim 4, wherein the acquiring of the plurality of positioning results comprises:
   acquiring a position of a key point of the facial area based on the feature vector.

6. The positioning method of claim 1, wherein the updating of at least one of the plurality of predetermined positioning models and the evaluation model comprises:
   classifying an image type of the facial area based on the selected positioning result; and
   updating at least one of the plurality of predetermined positioning models and the evaluation model based on the classified image type.

7. The positioning method of claim 1, wherein the evaluation model includes a plurality of classifiers respectively trained in correspondence to the key points.

8. The positioning method of claim 7, wherein the evaluating of the plurality of positioning results comprises:
   configuring image blocks with a preset size based on determined positions of the key points respectively included in the plurality of positioning results;
   acquiring evaluation ratings by inputting the image blocks to the classifiers; and
   evaluating the plurality of positioning results based on the evaluation ratings.

9. The positioning method of claim 8, wherein the image blocks comprises a positive sample image block in which a distance between a center position, of the positive sample image block, and a position of a key point is within a preset distance and a negative sample image block in which a distance between a center position, of the negative sample image block, and the position of the key point is outside the preset distance.

10. The positioning method of claim 8, wherein the updating of at least one of the plurality of predetermined positioning models and the evaluation model comprises:
selecting a single positioning result from among the plurality of positioning results based on the evaluation ratings;
comparing evaluation ratings of the selected single positioning result to a preset first threshold; and
updating at least one of the evaluation model and the plurality of predetermined positioning models based on a result of the comparing.

11. The positioning method of claim 10, wherein, when the updating of at least one of the plurality of predetermined positioning models and the evaluation model includes the updating of the evaluation model, the updating of the evaluation model comprising:
adding an input image corresponding to the selected single positioning result to a training set;
generating a preset number of positive sample image blocks and negative sample image blocks based on positions of key points corresponding to the selected single positioning result; and
updating the evaluation model by training the classifiers using the generated positive sample image blocks and negative sample image blocks.

12. The positioning method of claim 10, wherein, when the updating of at least one of the plurality of predetermined positioning models and the evaluation model includes updating a positioning model of the plurality of the predetermined positioning models, the updating of the positioning model comprises:
determining a type of a positioning model corresponding to the selected single positioning result, in response to the evaluation ratings of the selected single positioning result being determined to be greater than the first threshold.

13. The positioning method of claim 12, wherein the updating of the positioning model further comprises:
adding the selected single positioning result to a training set corresponding to one of plural respective types of the plurality of predetermined positioning models, in response to the determined type being determined to correspond to any of the plural respective types of the plurality of predetermined positioning models; and
updating the positioning model by training the plurality of predetermined positioning models using the training set to which the selected single positioning result was added.

14. The positioning method of claim 12, wherein the updating of the positioning model comprises:
configuring a new training set corresponding to the selected single positioning result, in response to the determined type being determined to not correspond to the plural respective types of the plurality of predetermined positioning models.

15. The positioning method of claim 14, further comprising:
training a new positioning model based on facial image samples included in the new training set, in response to a total number of facial image samples included in the new training set being determined to be greater than a second threshold.

16. A non-transitory computer-readable recording medium comprising computer readable code to control at least one processing device to implement the method of claim 1.

17. A positioning apparatus comprising:
a communicator configured to acquire an input image;
a memory configured to store a plurality of predetermined positioning models; and
a processor configured to
a plurality of positioning results including positions of key points of a facial area included in the input image, respectively using the plurality of predetermined positioning models,
respectively map the input image to each of the plurality of predetermined positioning models,
acquire respective positions of the key points of the facial area corresponding to key points of each of the plurality of predetermined positioning models, and
update at least one of the plurality of predetermined positioning models and an evaluation model based on a positioning result that is selected, based on an evaluation result acquired using an evaluation model of the positions of the key points of the facial area, from among the plurality of positioning results.

18. The positioning apparatus of claim 17, wherein the processor is further configured to configure image blocks with a preset size based on determined positions of the key points respectively included in the plurality of positioning results, to acquire evaluation ratings by inputting the image blocks to a plurality of classifiers respectively trained in correspondence to the key points, and to acquire the evaluation result based on the evaluation ratings.

19. The positioning apparatus of claim 18, wherein the processor is further configured to select a single positioning result from among the plurality of positioning results based on the evaluation ratings, and to update at least one of the evaluation model and the plurality of predetermined positioning models based on a result of a comparing of the evaluation ratings of the selected single positioning result to a preset first threshold.

* * * * *